July 18, 1961  C. G. SILVERBERG  2,992,518
METHOD OF MAKING FUSED GLASS ARTICLES
Filed June 22, 1956  2 Sheets-Sheet 1
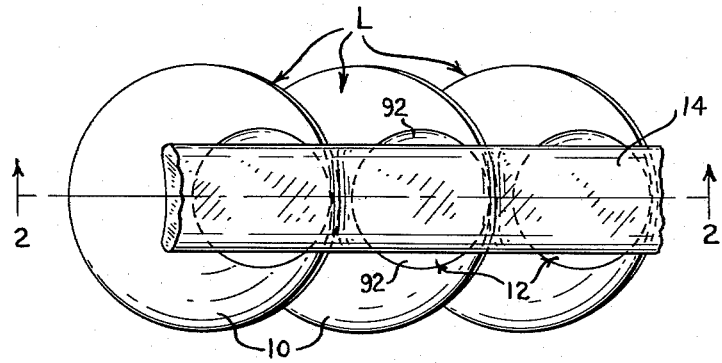
Fig. 1
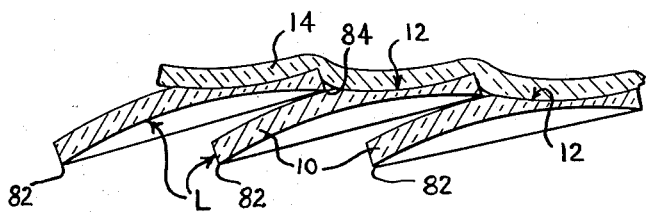
Fig. 2
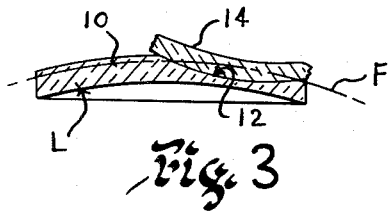
Fig. 3
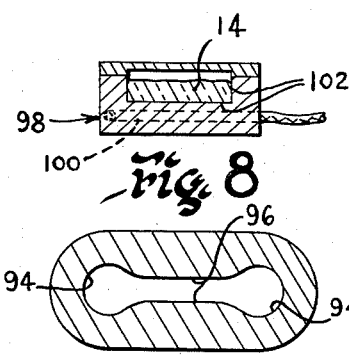
Fig. 8
Fig. 9
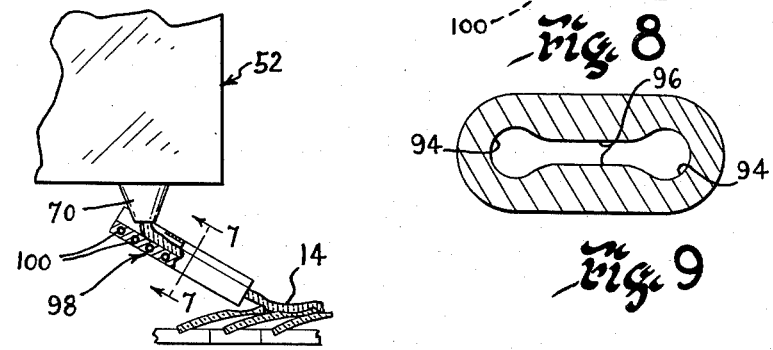
Fig. 7
INVENTOR
CARL G. SILVERBERG
BY Louis L. Gagnon
ATTORNEY

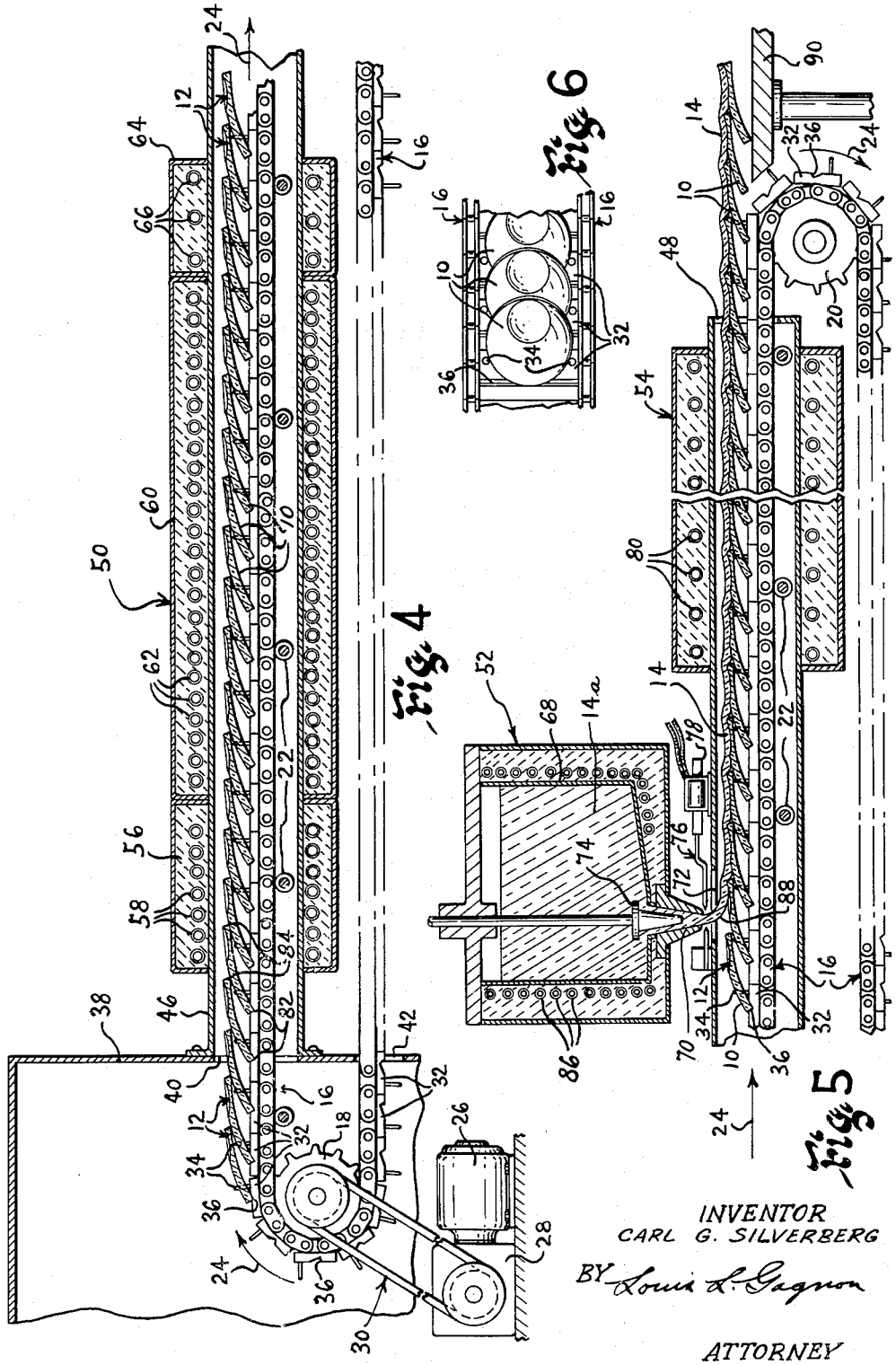

United States Patent Office 2,992,518
Patented July 18, 1961

2,992,518
METHOD OF MAKING FUSED GLASS ARTICLES
Carl G. Silverberg, Sturbridge, Mass., assignor to American Optical Company, Southbridge, Mass., a voluntary association of Massachusetts
Filed June 22, 1956, Ser. No. 593,203
2 Claims. (Cl. 49—82.1)

This invention relates to the art of forming fused glass articles, such as multifocal lens blanks or the like, and has particular reference to the process for making such articles.

It has been common practice heretofore in the manufacture of fused bifocal lens blanks and the like to employ several different methods. One of the most common methods is that of forming a ground and polished countersink area in one side surface of the major portion of the lens blank and a complementary ground and polished surface on one side of a disc of higher index glass to be fused in said countersink. This method not only requires careful cleansing of the surface of the several parts to be heat-joined but also requires that no air or interfacial bubbles be trapped between the surfaces during the fusing operation. In this latter respect, in order to avoid liberation of gases during fusion, the surfaces required special treatment to insure that nothing was present to cause the liberation of such gases. Another difficulty with this method was that of supporting and maintaining the parts in proper aligned relation with each other prior to and during the fusing operation and in order to avoid trapping air bubbles between the parts.

To improve upon such method both from the standpoint of quality of product and economy of manufacture, attempts have been made to deposit a measured unit amount of low melting glass into the countersink areas of the major portions and thereafter heat the measured unit of glass to a temperature whereby it will flow to the shape of the countersink and fuse thereto. It has further been suggested, in this respect, that the application of molten glass to each countersink be accomplished by flowing a metered unit amount of molten glass across the countersink as the molten glass is being discharged from a furnace or the like and thereafter shearing the glass. However, in such a process it is necessary to exercise considerable care to avoid having visible shear marks present resulting from said shearing of the individually metered portions of the molten glass as it is dispensed from the furnace, since such might very well cause strain or like defects in the lens blanks resulting therefrom. This latter method, although intended to avoid the trapping of air between the fused interfaces of the joined parts, still encountered the problem of internal bubbles resulting from the liberation and possible trapping of gases between the fused interfaces.

The present invention, therefore, has as one of its primary objects the overcoming of all of the above and many other difficulties by producing a plurality of fused lens blanks in a relatively rapid continuous progressive inexpensive sequence while avoiding the trapping of air or other gases between the fused interfaces of the parts and while avoiding the forming of shear marks and areas of internal stress which might result therefrom.

Another object is to provide an improved process of fabricating and joining glass parts so as to produce a large number of similar articles, such as fused multifocal lens blanks or the like, by supporting the preformed parts for forming the major portions in predetermined aligned adjacent relation with each other and then laying or flowing a ribbon of molten glass transversely of and upon said article (that is, in the direction of alignment thereof); whereby said ribbon will progressively and successively fill in and fuse to controlled areas of said preformed major parts.

Another object is to provide an improved method of joining the parts of multifocal lens blanks or the like wherein a plurality of said articles may be progressively and successively integrally connected together in the form of an elongated fused member with the parts thereof in accurately controlled predetermined aligned relation with each other.

Another object is to provide a relatively simple and rapid continuous process for producing a superior quality of fused type multifocal lens blanks wherein the interfacial surfaces of the adjoining fused parts of each of said lens blanks will be free of distortion and defects such as striations, bubbles or the like.

Another object is to provide a novel method of flowing a continuous ribbon of a preselected heated glass composition over the prealigned countersink portions of a plurality of previously temperature-conditioned major portions of lens blanks, and simultaneously controlling the temperature, shape, and rate of travel and flow of said ribbon of glass relative to said major portions, to form fused segment portions, in said countersinks, of predetermined width and free from striations, bubbles or other interfacial defects.

Another object is to form multifocal lens blanks in the manner set forth above wherein the major portions of said lens blanks, having the preformed countersinks therein, are arranged in overlapping engaged relation with each other so as to position the countersink portions thereof consecutively in aligned adjacent relation with each other with said countersink portions lying substantially in a common horizontal plane substantially parallel to the direction of travel of said lens blanks so as to cause the above-mentioned glass ribbon to flow into said countersink portions while covering only a minimum of the surface area of the blanks adjacent said countersink portions and to further permit said ribbon to flow evenly over said countersink portions and thus prevent any undue stretching or strain to said ribbon which might normally result from any substantial inclination of said countersink areas relative to the direction of travel thereof.

Another object is to provide means for imparting size and shape control to the above-mentioned glass ribbon while flowing said ribbon over said above-mentioned countersink portions so as to cause the countersink portions to be sufficiently filled with said glass ribbon to a depth permitting the proper subsequent finishing of the lens blanks and to further provide exposed unfilled areas of the countersink portions on each side of the glass ribbon which may be subsequently used as reference areas in the finishing of the lens blanks.

Another object is to provide an apparatus for fusing multifocal lens blanks which embodies a dust-proof endless type of conveyor system having heating and degassing and glass temperature-conditioning stations therealong and means for supporting and moving the lens blanks along said conveyor system through said conditioning stations, further means for producing and flowing a heated glass ribbon to fuse to selected areas of said lens blanks and thereafter annealing and discharging the fused lens blanks from said conveyor system whereby said apparatus may be maintained in continuous operation for desired extended periods of time.

An additional object is to provide a method of applying and fusing a ribbon of molten glass to the previously formed countersink areas of the major portions of a plurality of lens blanks whereby the air in the countersink areas will be completely expelled by said flow of the ribbon prior to its fusion therewith so as to provide a positive interfacial fusion between said ribbon and countersink areas which is free of air bubbles or other defects.

A further object is to provide a bifocal fusing process of the above character which permits the controlled degassing and temperature-conditioning of the countersink areas of the major portions of the lens blanks prior to the application of the minor or segment portions thereto while maintaining said countersink areas free from dust, dirt or the like and from distortions.

A still further object is to provide a novel process of fabricating fused type multifocal lens blanks which is simple, highly efficient and accurate and which, for reasons of its relatively rapid rate of progressively and successivly producing such lens blanks, provides a manufacturing process capable of economically producing superior quality lens blanks.

Other objects and advantages of the invention will become apparent from the following description taken in conjunction with the accompanying drawings in which:

FIG. 1 is a plan view of a plurality of fused multifocal lens blanks or the like resulting from the method and process embodying the invention;

FIG. 2 is a sectional view taken on line 2—2 of FIG. 1 and looking in the direction of the arrows;

FIG. 3 is a sectional view of a single lens blank resulting from the teachings of the invention and further illustrating the manner in which said blank would be subsequently surfaced;

FIG. 4 is a diagrammatic illustration of a portion of a preferred form of apparatus used to carry out the method of the invention;

FIG. 5 is a similar diagrammatic illustration of the remaining portion of said apparatus which, when combined with FIG. 4 would constitute the complete apparatus embodying the invention;

FIG. 6 is a fragmentary top plan view of the lens blank supporting and aligning means of the apparatus;

FIG. 7 is a diagrammatic illustration of a modified form of glass discharge or ribbon-forming means which may be used in conjunction with the embodiment of the invention;

FIG. 8 is a cross-sectional view taken on line 8—8 of FIG. 7; and

FIG. 9 is a diagrammatic sectional illustration of one form of a glass discharge orifice which may be used to bring about the results desired of the invention.

Referring more particularly to the drawings wherein similar reference numerals designate similar parts throughout the various views, FIGS. 1 and 2 illustrate as an embodiment of the invention a plurality of fused multifocal lens blanks L formed in accordance with the invention. Said lens blanks L each comprise a major portion 10 preferably formed of an optical crown glass or the like. Said major portions 10 are each provided with a ground and polished countersink 12 of a controlled curvature to which a ribbon 14 of flint, barium or other suitable high index optical glass is fused so as to form the minor or segment portion of the blank L. The glass composition of said ribbon 14 is selected to provide the optical characteristics desired of the segment or reading portion of the resultant lenses to be formed from said blanks L and the curvature of each of said countersinks 12 is controlled in accordance with standard practice to produce the desired add in power to the reading or segment portion of said finished lens. It is pointed out that, although only three lens blanks L are shown in connected relation with each other (FIGS. 1 and 2), it will be apparent that a continuous strip of any desired number of similarly connected lens blanks may be formed by the apparatus and process to be hereinafter described.

The subsequent finishing of the lens blanks L is accomplished by breaking away or separating the blanks from each other as shown in FIG. 3 and providing a controlled surface curvature F on the segment sides thereof in accordance with standard practice. The blanks L may be separated by striking the ribbon portion 14 thereof at a point between the countersink portions of the blanks or by simply dropping a strip of said blanks a short distance onto a relatively hard surface.

The apparatus embodying the invention, which is diagrammatically illustrated in FIGS. 4, 5 and 6, comprises a conventional type of conveyor system having an endless chain belt 16 or the like which is supported by sprockets 18 and 20 and a plurality of intermediate guide rollers or the like 22. Rollers 22 are positioned along the underside of the uppermost portion of chain 16 so as to cause said portion of the chain to assume and maintain a substantially horizontal position while traveling from sprocket 18 to sprocket 20. Arrows 24 indicate the direction of travel of the chain. Chain 16 is driven by means of an electric motor or the like 26 through conventional gear reduction means diagramamaticlly illustrated by box 28 which, in turn, is coupled to sprocket 18 by a pulley and belt arrangement 30. Rotation of sprocket 18 in a clockwise direction, as viewed in FIG. 4, by said drive means will then cause the uppermost portion of chain 16 to travel from left to right as viewed in FIGS. 4 and 5. It is pointed out that although the chain 16 is shown as being driven by sprocket 18 for ease of illustration, the drive means 26, 28 and 30 could be alternatively applied to sprocket 20.

In order to properly align and support the lens blanks to be processed, a plurality of block-like holders 32 are mounted in edge-to-edge aligned relation with each other on the chain 16 and are so attached thereto at the central portions thereof so as to permit said chain to maintain an intimate fit about the sprockets 18 and 20. Movement of chain 16 by rotation of sprocket 18 will cause the holders 32 adacent said sprocket to advance in a clockwise direction and each, in turn, to assume a horizontal position substantially parallel to the direction of travel of said chain with their leading and trailing edges in adjacent relation with each other. Each of the holders 32 are provided with a pair of spaced outwardly extending lens blank aligning pins 34 and a notched recess 36 for receiving a lower rear edge portion of a lens blank in the manner illustrated in FIGS. 4, 5 and 6.

It will become apparent as the description progresses that it is essential to maintain the lens blanks completely free from dirt, dust and the like during the processing thereof and for this reason, a dust-proof loading chamber 38 is provided to enclose the end of the conveyer adjacent its drive sprocket 18. The chamber 38 may be slightly pressurized or otherwise controlled to prevent the external atmosphere from entering and contaminating the lens blanks being handled therein. Openings 40 and 42 are provided in the forward side wall of chamber 38 to permit the drive chain 16 and its attached lens blank holders 32 to pass through said chamber and a dust-proof enclosure 46 is provided to enclose the upper portion of the conveyer system. Enclosure 46 is attached to the chamber 38 with its entrance opening communicating with the opening 40 therein and is provided with a restricted exit opening 48 at its opposite end which is spaced a predetermined distance from sprocket 20.

The apparatus further embodies, from left to right (FIGS. 4 and 5), a temperature-conditioning furnace 50 in surrounding relation with the enclosure 46, a heated glass containing and dispensing means 52 followed by a glass annealing furnace 54, surrounding the enclosure 46 in a manner similar to that of furnace 50.

Furnace 50 includes a first section 56 having heating coils 58 therein which are adapted to preheat the portions 10 of the lens blanks, carried by the conveyer, prior to entering a second section 60 thereof. This preheating eliminates the adverse effect of heat shock to the glass which may occur if the blanks were immediately plunged into the second section 60 of the furnace. Section 60 has independently controlled heating coils 62 which are such as to increase the temperature of the lens blanks while passing therethrough to a temperature sufficient to cause a degassing of the surfaces thereof and a third section 64 of furnace 50 having independently controlled heating coils 66 therein which are such as to reduce the temperature of the degassed lens blanks to a controlled temperature which is suitable for the subsequent fusing operation. The above temperature-conditioning of the lens blanks will be discussed in detail hereinafter.

Degassing, as used herein, refers to the freeing of the surfaces to be fused from any materials which might liberate gases during the fusing operation and more particularly which might liberate gases at temperatures above those required for fusion.

The glass containing means embodies a heated glass storage tank 68 having an exit or discharge port 70 for dispensing the ribbon 14 of glass through an opening 72 in the enclosure 46 and onto the surfaces of the major pieces 10 of the blanks L which are carried by the conveyer. A tapered plunger 74 is adjustably positioned in the exit port 70 to control the rate of flow of the glass therethrough. The tank 68, port 70 and plunger 74 would preferably be formed of a corrosion resistant material such as platinum or the like to prevent the formation of stria in the glass. A shearing means 76 is provided adjacent the outlet orifice of port 70 having suitable shearing blades to sever the ribbon of glass 14 at the conclusion of a fusing cycle or whenever desired. The blades of the shearing means 76 are activated by a solenoid 78 or any other suitable means.

The glass annealing furnace 54, having heating coils 80 therein is such as to cause a controlled progressive cooling or annealing of the lens blanks while passing therethrough.

The lens blanks L are processed in the following manner:

The major pieces 10 of the blanks L, having been provided with suitable countersink portions 12 in the usual manner, are thoroughly cleansed to be free of dirt, dust or the like and are placed in the dust-proof chamber 38 to be loaded in overlapping relation with each other on the conveyer. Said loading may be accomplished by manually or automatically positioning the pieces 10 between the aligning pins 34 of the respective holders 32 with the lower rear edge portions 82 thereof seated in the recess 36 of said respective holder and with forward lower edge portions 84 of each piece resting upon a previously loaded piece 10.

It is pointed out that the first piece 10 to be loaded on the conveyer must be supported at its forward edge by placing a suitable spacer block or the like between said forward edge and its holder 32 which is such as to cause the plane of the countersink portion of said piece to assume a position substantially parallel to the direction of travel of the uppermost portion of the conveyer. However, the pieces 10 will thereafter be mounted in overlapping relation with each other as shown in FIGS. 4 and 5 with the centers of the countersink portions thereof aligned along a connon axis and in adjacent spaced relation with each other. The distance between the recesses 36 of the holders 32 is so controlled relative to the outer diameter of the pieces 10 as to cause the plane of the countersink portions thereof to each assume a position substantially parallel to the direction of travel of said conveyer when said pieces are in stacked aligned relation with each other as described. The said pieces are preformed to a controlled substantially uniform size and shape.

The movement of the conveyor will then cause the loaded pieces 10 of the blanks L to pass through opening 40 of the chamber 38 and into the enclosure 46 to be temperature-conditioned and degassed by furnace 50. Said temperature-conditioning and degassing of the pieces 10 is accomplished by precisely controlling the rate of travel of the conveyer, the temperatures of the various sections 56, 60 and 64 of the furnace 50 and the length of said sections. For example, in order to bring about a proper degassing of optical crown glass, from which the major pieces 10 of multifocal lens blanks are most commonly formed, it is essential to heat said glass to a temperature of slightly under 1060° Fahrenheit and to control the length of the section 60 and the rate of travel of the conveyer so as to cause said pieces 10 to be exposed to said temperature for a time period of approximately 30 minutes. However, satisfactory results have been accomplished within the range of 1040° to 1060° Fahrenheit.

In order to eliminate the adverse effects of heat shock to the glass and to prevent a possible cooling of the degassing section 60 of furnace 50 by immediately passing cold glass pieces 10 into said section 60, furnace 50 is provided with a preceding section 56 which is adapted to preheat the glass to a controlled temperature, for example, of approximately 950° Fahrenheit.

After having passed through the preheating and degassing sections 56 and 60 of furnace 50, the pieces 10 are subjected to a controlled reduced temperature or cooling by the additional section 64 of furnace 50. Said reduced temperature or cooling then conditions the glass for the fusing operation which immediately follows. Satisfactory results have been accomplished by reducing the temperature of the glass to approximately 900° Fahrenheit.

It is pointed out that the above-mentioned temperatures are all given by way of example and that various combinations of temperatures and durations of exposure of the glass to said temperatures will produce equally satisfactory results depending upon the nature of the glass of said pieces. It is also pointed out that a highly efficient degassing of the glass may be obtained within the ranges as set forth above without introducing distortion to the countersink curvature of the lens blank pieces 10.

Having advanced through the temperature-conditioning furnace 50, the pieces 10 then pass beneath the opening 72 in enclosure 46 whereupon the glass ribbon 14, flowing from the container 52, FIG. 4, is continuously applied to said pieces to produce the minor or segment portions of the blanks L. The glass 14a in tank 68 is maintained at a substantially constant temperature by heating coils or the like 86 which are such as to allow said glass to flow from the exit port 70 at a continuous uniform rate which is so controlled in accordance with the rate of travel of the conveyer as to cause the ribbon 14 to be formed of a uniform size, thickness and shape. For example, a temperature of approximately 1715° Fahrenheit has been found to produce the desired results when using the usual type of optical flint glass and with the proper control of the speed of travel of the pieces which, in most instances, is such as to substantially equal the speed of flow of the ribbon.

By aligning the general planes of the countersink areas of the lens blank pieces 10 parallel to the direction of travel of the conveyor as described above, and properly controlling the rate of travel of said conveyor in accordance with the rate of flow of the glass ribbon 14, said ribbon will be caused to flow evenly over the countersink portions without stretching or otherwise distorting. Moreover, by placing the major pieces 10 of the blanks in overlapping aligned relation with each other as previously described, the ribbon will flow over the countersink portions while covering only a minimum of the surface area of the pieces 10 surrounding said countersink portions. This minimizes the amount of glass to be subsequently removed during the finishing of the resultant lens blanks and results in increased savings in material as well as labor.

It is pointed out that the movement of the conveyer relative to the portion 88 of the ribbon 14 near the exit port 70 will cause the ribbon 14 to assume an acute angle with respect to the plane of the countersink area of an adjacent piece 10 and by so doing, the air in said countersink area will be completely exhausted by the progressive relative movement of the ribbon immediately prior to its engagement and fusion with the countersink curvature.

Since the major pieces 10 of the lens blanks approach the glass ribbon 14 at the comparatively low temperature of approximately 900° Fahrenheit, as described above, it can be seen that the pieces 10, each being of relatively large area, will dissipate a sufficient amount of the heat from the ribbon 14 to provide a positive interfacial fusion between the countersink curvatures thereof and the ribbon 14 without causing distortion to said countersink curvatures.

Following the application of ribbon 14, the now fused lens blanks L pass through furnace 54 which is controlled by suitable heating elements 80 to provide a glass conditioning or annealing period. The length of furnace 54 is controlled in accordance with the rate of travel of the conveyer to cause the blanks L to remain in the furnace 54 for a given time period sufficient to bring about their proper annealing. For example, a minimum time period of 30 minutes would prove satisfactory with the temperature of furnace 54 being controlled by elements 80 to progressively decrease from left to right as viewed in FIG. 5 from approximately 1060° Fahrenheit to approximately 850° Fahrenheit.

Having passed through the furnace 54, the lens blanks L then move outwardly through the exit opening 48 of the enclosure 46 and into the external atmosphere for further rapid cooling.

An unloading platform 90 is provided at the end of the conveyer to receive the fused strip of blanks in the manner illustrated in FIG. 5. By properly controlling the distance from opening 48 of enclosure 46 to the platform 90 in accordance with the rate of travel of the conveyer, the blanks may be sufficiently cooled in the surrounding atmosphere to permit their handling at the time they reach said platform. The blanks are then removed from platform 90 and individually separated in the manner described above or they may be maintained in strip form for ease of handling and separated at a later time.

In order to produce a finished optical surface on each of the sgment sides of the separated blanks in accordance with standard practice, it is essential, in many cases, that a portion of the countersink curvature 12 be used for reference purposes in aligning the blanks on the particular apparatus used to produce said finished surface. For this reason, the width of ribbon 14 is controlled to have a dimension substantially less than that of the diameter of the countersink areas of the lens blanks so as to provide an exposed portion 92 of the countersink surfaces at each side of said ribbon as shown in FIG. 1.

In order to properly control the width of ribbon 14 while simultaneously controlling its thickness, to provide a depth of glass in the countersink which is sufficient to permit the proper subsequent finishing of the blanks, the outlet orifice of the port 70 is shaped, in cross-section, substantially as shown in FIG. 9. By providing the longitudinal side edges 94 of said orifice of a thickness greater than that of the central area 96, the surface tension on the ribbon will produce a controlled nearly rectangular cross-sectional shape and size to said ribbon 14 as it flows outwardly of said orifice. It is pointed out that various other factors such as the temperature and rate of flow of the glass and the rate of travel of the blanks with respect to said glass flow also contribute to the final size and shape of ribbon 14. Therefore, the exact shape of the orifice must be determined in accordance with said factors. It is quite obvious that if the rate of travel of the blanks exceeds the rate of flow of the glass ribbon, said ribbon will be slightly stretched as it flows into the countersinks and vice versa.

An alternate means for shaping the ribbon 14 is diagrammatically shown in FIGS. 7 and 8 wherein a heated chute 98 is used to direct the glass from the outlet port 70 of container 52 to the lens blanks. Chute 98 is provided with suitable heating coils or the like 100 which prevent an undesirable cooling of the glass while traveling from the port 70 to the blanks L. The heated glass, while traveling along said chute will assume the controlled shape of the cavity 102 and be deposited on blanks L in substantially the same shape.

From the foregoing, it can be seen that a relatively rapid yet simple and efficient means and method of forming fused multifocal lens blanks has been provided and that many of the time-consuming and costly operations inherent in present day commercial practices have been eliminated. For instance, said practices usually require that the minor elements of the blanks be separately ground and polished, on one side, to a contour approximately that of the countersink in the major elements and thereafter assembled with said polished surfaces in engaged relation with the countersinks and heated to fuse the elements together in their area of contact. The present invention, however, obviates the steps of grinding and polishing the minor elements and separately assembling the parts of each lens blank. Moreover, the above-described apparatus and process permits a degassing and temperature-conditioning of the major elements of the blanks prior to the application of the minor or segment portions so as to produce a more positive interfacial fusion between the finally assembled parts of the blanks which is completely free of such defects which might result therefrom.

It is pointed out that an improved, simplified and economical method has been provided for obtaining all the objects and advantages of the invention. However, it is apparent that many changes in the details of construction, arrangement of parts and the steps in the process may be made without departing from the spirit of the invention as expressed in the accompanying claims. The invention, therefore, should not be considered in a limiting sense.

Having described my invention, I claim:

1. The method of forming fused glass articles comprising supporting a plurality of major pieces of glass, each having an area provided with a finished optical surface thereon, in adjacent partially overlapping aligned relation with each other and with said areas exposed in substantially the same direction along a common axis, establishing a continuous flow of a ribbon of molten glass of a temperature considerably above that of said major pieces and of a controlled width, heating said major pieces to a temperature sufficient to prevent the effects of heat-shock when said ribbon is subsequently flowed onto said pieces and directing the flow of said ribbon uninterruptedly across said major pieces in the direction of said common axis onto said areas to cover said areas throughout the width of said ribbon and to simultaneously cause the glass of said ribbon to fuse to the surfaces of said areas.

2. The method of forming fused glass articles comprising supporting a plurality of major pieces of glass, each having an area provided with a finished optical surface thereon, in aligned relation with each other and with said areas exposed and spaced relative to each other in substantially the same direction along a common axis, establishing a continuous flow of a ribbon of molten glass of a temperature considerably above that of said major pieces, and of a controlled width less than that of said major pieces, heating said major pieces to a temperature sufficient to prevent the effects of heat-shock when said ribbon is subsequently flowed onto said pieces and directing the flow of said ribbon uninterruptedly across said major pieces in the direction of said common axis onto said areas to cover said areas throughout the width of said ribbon and to simultaneously cause the glass of said ribbon to fuse to the surfaces of said areas.

(References on following page)

References Cited in the file of this patent

UNITED STATES PATENTS

| | | |
|---|---|---|
| 1,370,042 | Parsons | Mar. 1, 1921 |
| 1,544,612 | Tillyer | July 7, 1925 |
| 1,934,798 | Gelstharp | Nov. 14, 1933 |
| 1,984,924 | Fox | Dec. 18, 1934 |
| 1,984,942 | Owen | Dec. 18, 1934 |
| 2,026,165 | Goodwillie | Dec. 31, 1935 |
| 2,145,351 | Hazelton | Jan. 31, 1939 |
| 2,303,885 | Miller et al. | Dec. 1, 1942 |
| 2,433,013 | Ziegler | Dec. 23, 1947 |
| 2,538,589 | Poje | Jan. 16, 1951 |
| 2,574,960 | Courmettes | Nov. 13, 1951 |
| 2,618,200 | Clave et al. | Nov. 18, 1952 |
| 2,640,299 | Sheard et al. | June 2, 1953 |
| 2,717,474 | Barradell-Smith | Sept. 13, 1955 |
| 2,734,315 | Poundstone | Feb. 14, 1956 |

FOREIGN PATENTS

| | | |
|---|---|---|
| 279,322 | Great Britain | Oct. 27, 1927 |